United States Patent
Morton et al.

(10) Patent No.: US 10,557,575 B2
(45) Date of Patent: Feb. 11, 2020

(54) CONVEYING OF EMULSION EXPLOSIVE

(71) Applicant: ORICA INTERNATIONAL PTE LTD., Singapore (SG)

(72) Inventors: Darren Morton, Melbourne (AU); Su Nee Tan, Melbourne (AU)

(73) Assignee: ORICA INTERNATIONAL PTE LTD., Singapore (SG)

( * ) Notice: Subject to any disclaimer, the term of this patent is extended or adjusted under 35 U.S.C. 154(b) by 0 days.

(21) Appl. No.: 15/526,622

(22) PCT Filed: Nov. 13, 2015

(86) PCT No.: PCT/AU2015/050714
§ 371 (c)(1),
(2) Date: May 12, 2017

(87) PCT Pub. No.: WO2016/074045
PCT Pub. Date: May 19, 2016

(65) Prior Publication Data
US 2017/0314707 A1    Nov. 2, 2017

(30) Foreign Application Priority Data
Nov. 13, 2014    (SG) .......................... 10201407513Y

(51) Int. Cl.
*E21C 37/00* (2006.01)
*F15D 1/02* (2006.01)
(Continued)

(52) U.S. Cl.
CPC .............. *F16L 11/12* (2013.01); *E21C 37/00* (2013.01); *F15D 1/02* (2013.01); *F42D 1/10* (2013.01)

(58) Field of Classification Search
CPC .. F16L 11/12; E21C 37/00; F42D 1/10; F15D 1/02
See application file for complete search history.

(56) References Cited

U.S. PATENT DOCUMENTS

| 3,528,260 A | 9/1970 | Binder |
| 4,273,147 A | 6/1981 | Olney |

(Continued)

FOREIGN PATENT DOCUMENTS

| EP | 1236944 A1 | 9/2002 |
| EP | 1741553 A1 | 1/2007 |

(Continued)

OTHER PUBLICATIONS

International Search Report and Written Opinion from corresponding International Application No. PCT/AU2015/050714 dated Dec. 1, 2015.

(Continued)

*Primary Examiner* — Nicole Coy
*Assistant Examiner* — Yanick A Akaragwe
(74) *Attorney, Agent, or Firm* — Lando & Anastasi, LLP

(57) ABSTRACT

This invention provides a hose for conveying an emulsion explosive together with an annular stream of aqueous solution around the emulsion explosive as a lubricant, wherein the hose comprises an internal surface that reduces disruption of the annular stream during conveying of the emulsion explosive. Also provided is a method of producing this type of hose and practical applications of the hose in commercial mining and blasting operations.

9 Claims, 8 Drawing Sheets

(51) Int. Cl.
     *F16L 11/12*     (2006.01)
     *F42D 1/10*      (2006.01)

(56) References Cited

U.S. PATENT DOCUMENTS

| | | | | |
|---|---|---|---|---|
| 5,145,289 | A * | 9/1992 | Titus | E21B 43/0107 |
| | | | | 166/350 |
| 8,820,242 | B2 * | 9/2014 | Alexander | F42D 1/10 |
| | | | | 102/313 |
| 2014/0182735 | A1 | 7/2014 | Dyksterhouse | |

FOREIGN PATENT DOCUMENTS

| | | |
|---|---|---|
| EP | 2727719 A1 | 5/2014 |
| JP | H05230229 A | 9/1993 |
| JP | 2004229886 A | 8/2004 |
| JP | 4264269 B2 | 5/2009 |
| RU | 2028538 C1 | 2/1995 |
| RU | 2133007 C1 | 7/1999 |
| RU | 2163344 C2 | 2/2001 |
| RU | 2262035 C1 | 10/2005 |
| RU | 2416782 C1 | 4/2011 |
| WO | 2008125053 A1 | 10/2008 |

OTHER PUBLICATIONS

Extended European Search Report from corresponding European Application No. 15858211.4 dated May 17, 2018.
V. Urazaev. Gidrofilnost I gidrofobnost. Teknologii v electronnoy promyshlennosti, N3. 2006.

* cited by examiner

CONVEYING OF EMULSION EXPLOSIVE

CROSS-REFERENCE TO RELATED APPLICATIONS

This application is a U.S. National Stage Application under 35 U.S.C. § 371 of International Application No. PCT/AU2015/050714, filed Nov. 13, 2015, titled CONVEYING OF EMULSION EXPLOSIVE, which claims priority to Singaporean Application No. 10201407513Y, filed Nov. 13, 2014. International Application No. PCT/AU2015/050714 is incorporated by reference herein in its entirety.

TECHNICAL FIELD OF THE INVENTION

The present invention relates to conveying of an explosive emulsion through a hose, as is undertaken in commercial mining and blasting operations.

BACKGROUND TO THE INVENTION

Mining and blasting operations involve hazardous materials and thus safety is of utmost importance in all activities relating to such operations. One of the primary activities of a blasting operation is borehole loading in which an explosive is loaded into a previously drilled borehole, and detonated. The explosive is commonly an emulsion explosive containing ammonium nitrate (which may be referred to as Ammonium Nitrate Emulsion or ANE). The ANE is typically pumped into a borehole using a pump attached to a hose. However, due to its highly viscous nature, ANE can be difficult to pump, particularly over long distances (for example, when loading deep boreholes) and/or through small diameter hoses used in borehole loading. Furthermore, there are often many boreholes to be loaded on a blasting bench or stope and the process can be quite time consuming Just-in-time manufacture of the ANE (immediately before borehole loading may also result in the use of ANE at elevated temperatures and greater time spent loading boreholes can further reduce the pumpability of high temperature ANE elevating the safety hazards—most notably pump pressure.

In most industries, elevated pump pressure associated with transportation of high viscosity fluids through pipes is averted by using large diameters pipes of minimal length. However, several factors prevent the use of large diameter, short length pipes in loading of ANE into boreholes. These include, for example: the need for transportation of a borehole-loading-delivery system (such a mobile manufacture unit or MMU) around a mine site from borehole to borehole; borehole characteristics—including depth, diameter and direction; and difficulty in accessing boreholes, especially in underground mining. Instead, long, flexible and often narrow loading hoses must be used to transfer ANE from the delivery system into a borehole. The length of an ANE loading hose is typically 30 to 60 meters but can be longer, depending upon the depth of the borehole.

The diameter of the borehole being loaded may also be a factor in determining the size of the hose. The inner diameter of hose that can be used may be as narrow as 19 mm. Transfer of ANE through such a narrow diameter hose at suitably high volumetric flow rate can require pumping pressures in excess of safe levels.

Several methods have been used to ensure that pumping pressures are maintained within an acceptable range. For example, it is known to use an annular stream of aqueous solution around a core stream of ANE being pumped through the hose. The aqueous solution serves to lubricate ANE delivery through the hose. This approach is known as "core annular flow" and the aqueous solution often referred to as a "water-ring" with the ANE being referred to as a "core". However, under certain conditions the lubricating annular stream can be displaced or destroyed resulting in hose blockage and/or stalling of the delivery pump. In the industry this is known as "fouling", and it causes considerable disruption to operations as well as being a safety hazard.

These problems commonly occur when the ANE is conveyed at elevated temperature, for example when ANE is manufactured in a just-in-time manner, without time for cooling prior to delivery through the hose. Elevated ambient temperatures may reduce the ability the cool the ANE. In this case water in the annular stream may migrate into the ANE by osmosis due to concentration effects, thereby degrading the annular stream. Higher emulsion temperatures also reduce ANE viscosity, which may cause inconsistent flow of the core.

The lubricating annular stream may also be impaired or destroyed when ANE remains in the hose, for example when the MMU moves from borehole to borehole and/or when the ANE is conveyed over long distances, such as when loading deep boreholes. Regular flushing of the hose is therefore required to un-block or reduce fouling of the hose.

Ground conditions on a mine site, such as the quality of borehole preparation, ease of borehole access, level of ruggedness of terrain, etc., can further slow borehole loading. ANE remains in the hose while dealing with these challenges which further increases the risk of hose fouling.

Displacement or destruction of the lubricating aqueous solution provided as the annular stream can also occur due to density differences between the aqueous solution and the ANE. The aqueous solution may contain chemical species (such as sodium nitrite) that are included to react with ammonium nitrate in the ANE in order to generate gas bubbles in the ANE that render it sensitive to detonation. Static head or pressure differential can be caused by the gas-generating reaction (commonly referred to as "gassing reaction") commencing in the hose, or a combination thereof. At times, water present in the gassing solution can be absorbed by osmosis to the higher salinity of the ANE resulting in concentration of chemical species in the aqueous annulus and ultimately destruction of the annular stream. Destruction of the lubricating aqueous annular stream can also occur due to instability of the core annular flow. The stability of core annular flow may be influenced by the volumetric ratio and relative viscosity of the core and annular component. Core annular flow instability may also result in hose fouling.

Efforts to address displacement and destruction of the lubricating aqueous solution provided as the annular stream have included, for example:

Reducing ANE temperature, either through active cooling e.g. a heat exchanger or passive cooling e.g. increased inventory. However, both of these options are capital intensive due to the low thermal conductivity of ANE.

Managing the loading process in order to minimise down-time between holes.

Adjusting pH or the gassing reaction catalyst level to control or slow down the rate of the gassing reaction.

Adjusting the density of the aqueous solution to closer match that of the ANE to prevent segregation of the aqueous solution and ANE during down-time.

Flushing the hose with water to remove ANE fouling the hose.

Against this background it would be desirable to provide another way of improving delivery of an emulsion explosive, such as ANE, through a hose.

SUMMARY OF THE INVENTION

In accordance with the invention there is provided a hose for conveying an emulsion explosive together with an annular stream of aqueous solution around the emulsion explosive as a lubricant, wherein the hose comprises an internal surface that reduces disruption of the annular stream during conveying of the emulsion explosive.

Also provided is a method of producing this type of hose in which an internal surface of the hose is adapted to reduce disruption of the annular stream during conveying of the emulsion explosive in the manner described.

Further, there is provided a method of conveying an emulsion explosive, which method comprises conveying the emulsion explosive through a hose of the invention, wherein an annular stream of an aqueous solution is provided around the emulsion explosive as it is conveyed through the hose. In this and other aspects of the invention the annular stream of aqueous solution acts as a lubricant assisting flow of emulsion explosive through the hose.

There is also provided a method of delivering an emulsion explosive into a borehole, which method comprises conveying the emulsion explosive through a hose of the invention, wherein an annular stream of an aqueous solution is provided around the emulsion explosive to lubricate flow of the emulsion explosive as it is conveyed through the hose.

Also provided is a method of reducing fouling of a hose when an emulsion explosive is conveyed through a hose with an annular stream of aqueous solution as lubricant, the method comprising using a hose of the invention. The invention may be applied to achieve reduced fouling of the hose as emulsion explosive and aqueous solution flow through the hose and/or reduced fouling when flow is static for a period of time and then recommenced.

Also provided is a method of reducing hose pumping pressure on start up when pumping an emulsion explosive through a hose together with an annular stream of aqueous solution as lubricant as described, the method comprising using a hose of the invention.

Also provided is a method of reducing steady state hose pumping pressure when pumping an emulsion explosive through a hose together with an annular stream of aqueous solution as lubricant as described, the method comprising using a hose of the invention.

The term ANE or emulsion explosive as used herein embraces ammonium nitrate explosives in the form of emulsions as well as those containing prill, fuel oil, glass micro-balloons, expanded polystyrene beads, sensitizing gas bubbles and other additives.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that prior publication (or information derived from it) or known matter forms part of the common general knowledge in the field of endeavour to which this specification relates.

BRIEF DISCUSSION OF DRAWINGS

Aspects of the present invention are illustrated with reference to the accompanying non-limiting drawings in which.

Figure 1:
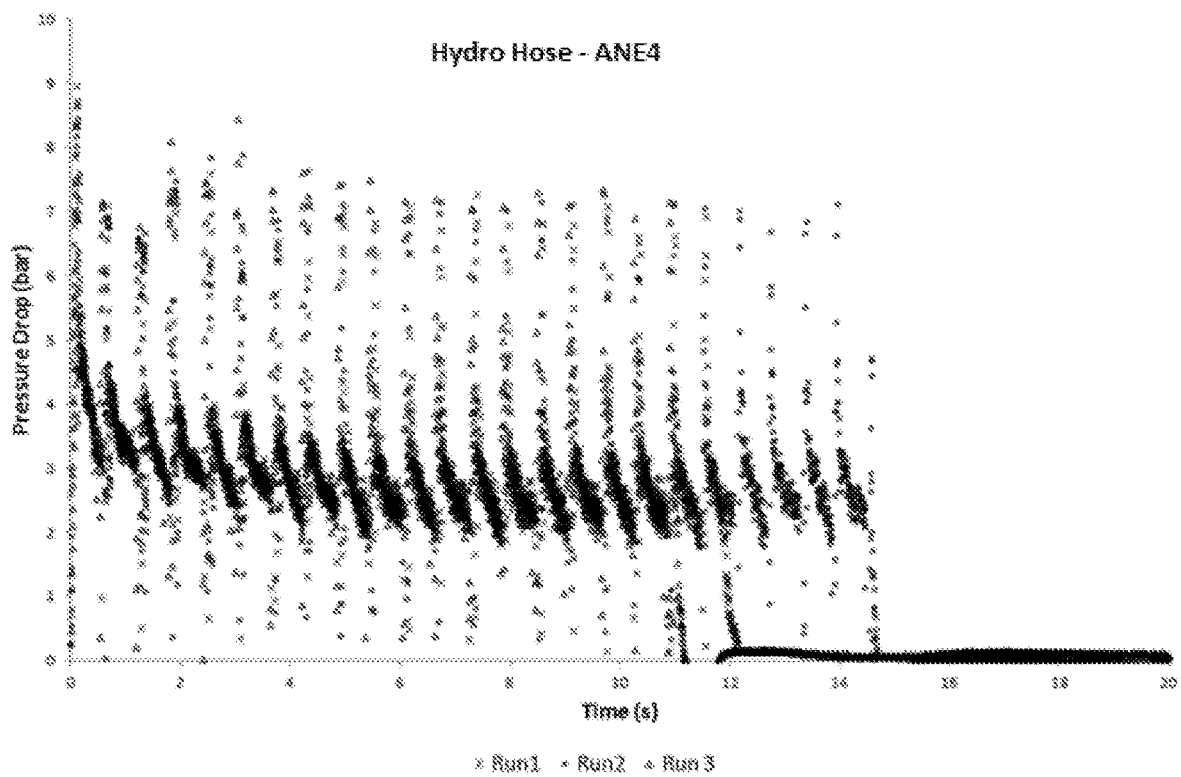
FIG. 1 shows a plot of pressure drop profile with time as referred to in Example 2

In figures the terms "Std" and "Standard" refer to conventional, untreated hoses. The terms "Hydro" and "Hydrophilic" refer to hoses in accordance with the present invention that have been to provide a hydrophilic surface characteristic.

DETAILED DISCUSSION OF THE INVENTION

In accordance with the invention, operational improvements may be achieved using a borehole hose, the internal surface of which reduces disruption of the annular stream during conveying of the emulsion explosive.

In an embodiment this desirable characteristic of the hose may be achieved by treatment of internal surfaces of a hose to impart surface properties that interact with the annular stream in order to retain its integrity/minimize its disruption when the hose is used. For convenience in this case the hose will be referred to as a "treated hose".

In an alternative embodiment the material from which the hose is made may be selected such that internal surfaces of the hose exhibit such surface properties. In this case it will be appreciated that this would involve selection of materials that are not conventionally used to form hoses used in the present context. For convenience in this case the hose will be referred to as an "as-produced hose".

In the present invention, the manner in which internal surfaces of the hose interact with the aqueous solution are responsible for improved integrity/reduced disruption of the lubricating annular stream during use of the hose. Thus, the internal surfaces are required to have a greater affinity for the aqueous solution than for the emulsion explosive being conveyed. In practice, the internal surface may be hydrophilic and/or hygroscopic with respect to the particular aqueous solution being used.

Herein the terms "hydrophilic" and "hygroscopic" refer to surface properties of the internal surface of the hose of the invention. In context the terms refer to a property of the surface relative to the aqueous solution that is used as a lubricant when emulsion explosive is caused to flow through the hose. The terms reflect the extent to which the aqueous lubricant is able to wet the surface. Thus, they are representative of the ability of the aqueous solution to maintain contact with the internal surface of the hose, noting that the lubricant is intended to be provided as an annular stream between the internal surfaces of the hose and the emulsion explosive in the hose. This ability results from intermolecular interactions when the aqueous solution and internal hose surface come into contact with each other. The degree of wetting (wettability) is relevant. The degree of wetting is governed by a force balance between adhesive and cohesive forces. While hydrophilic surface properties refer to an attraction to water, hygroscopic surface properties may refer to the ability to take up and retain water. Both surface properties can be effective in the context of the invention.

The wettability of a surface with respect to a liquid may be measured by reference to contact angle. This is the angle at which the liquid—vapor interface meets the solid—liquid interface. The contact angle is determined by adhesive and cohesive forces. As the tendency of a droplet of liquid to spread out over a flat, solid surface increases, the contact angle decreases. Thus, the contact angle provides an inverse measure of wettability. A contact angle less than 90° (low contact angle) usually indicates that wetting of the surface is very favorable, and the liquid will spread readily over a large area of the surface. Contact angles greater than 90° (high contact angle) generally means that wetting of the surface is unfavorable so the liquid will minimize contact with the surface and form a compact liquid droplet. In the context of the present invention, the surface characteristic of the hose is such that the contact angle with the aqueous solution being used/to be used as lubricant is preferably less than 90°, more preferably less than 60°. In embodiments, the contact angle may be less than 30°. The contact angle for a given surface may vary as between aqueous solutions used as hose lubricant, and vice versa. In the present invention the internal surface of the hose is designed and produced, or selected, so as to exhibit favourable wetting of the surface with respect to the aqueous solution to be used as lubricant.

The desirable characteristics for the internal surface of the hose can be achieved in various ways. In an embodiment, hydrophilic (and/or hygroscopic) character may be imparted to a (pre-existing) hose by suitable treatment of the internal surface of the hose. In this case production of a hose in accordance with the invention comprises treatment of a hose in order to impart suitable characteristics to the internal surface of the hose. Related to this there is provided a method of producing an improved hose suitable for conveying an emulsion explosive in the manner described, which method comprises treating a hose in order to increase the wettability of the internal surface with respect to the aqueous solution to be used as lubricant. In other words, treatment leads to a reduction in the contact angle of the surface with respect to the aqueous solution. For example, the hose may be treated in order to the render an internal surface of the hose hydrophilic, or more hydrophilic, hygroscopic, or more hygroscopic.

Making the internal surface of the hose suitably hydrophilic can be achieved, for example, by sulphonation, grafting hydrophilic polymer (typically as a monolayer) or molecules to the surface, applying nanometer scale structures or activating the surface by plasma treatment, coating in another manner. Selection of the hydrophilic treatment for making a hose hydrophilic may depend on the type of material from which the hose is composed, for example, the hose may be high density polyethylene (HDPE), ultra high molecular weight polyethylene (UHMWPE), polyvinyl chloride (PVC), Nylon, polytetrafluoroethylene (PTFE), virtually any polymeric material. In embodiments, the material from which the hose is made is high density polyethylene. In this case sulphonation has been found to be a useful technique to achieve the hydrophilic character required. In this case the treated hose should still exhibit suitable properties for use (for example, toughness, chemical resistance and flexibility, for example).

In another embodiment the as-produced hose, or relevant portions of therefore, may be made of a material that imparts suitable wettability. In this case the as-produced hose may be manufactured is inherently suitable respect to this characteristic. For example, the material may be sulphonated ABS (Cycolac™) where sulphonation occurs prior to polymerization, or Pebax®—a block copolymer having hydrophilic properties. In this embodiment, the material should also provide suitable properties for use as a hose, as described.

It may be convenient, for the entire internal surface of the hose to exhibit suitable wettability. However, in some situations only portions of the hose may need to exhibit the requisite wettability.

The aqueous solution forming the annular stream can be, for example water, an aqueous solution of nitrites, nitrates, an aqueous solution of catalyst, and the like, and combinations of these. In embodiments, the aqueous solution can be a "gasser solution" that functions as described above. One skilled in the art would be familiar with the types of aqueous solution used. Typically, the aqueous solution contains at least about 70 wt % water. When a "gasser solution" is used as the lubricant, a mixing device is usually provided at the end of the hose to ensure thorough mixing of gasser solution with the explosive product in order to achieve homogeneous sensitization.

The aqueous solution provides a lubricating annular layer between the emulsion explosive and the internal surface of the hose. The amount of aqueous solution used can range from about 1.0 to 3.3% v/v of total flow. Typically the amount of aqueous solution used during borehole loading can range from about 1.5 to about 2.9% v/v. However, improved lubricity associated with use of a hose in accordance with the invention may allow a reduced volume of aqueous lubricant to be used to convey a given volume of emulsion explosive.

Improvement in properties referred to herein are to be understood as being measured relative to the properties of an otherwise identical hose, the inner surface of which does not have the same wettability characteristics (and thus contact angle) with respect to aqueous solution to be used as lubricant as the hose of the invention. For example, a useful benchmark for performance may be conventional hoses formed from high density polyethylene.

The hose of the invention is useful for conveying an emulsion explosive when an annular stream of an aqueous solution is provided around (a core stream of) the emulsion explosive to lubricate flow of the emulsion explosive through the hose. The hose may function, for example, as a transfer hose for transferring emulsion explosive, as a hose for delivery of emulsion explosive into a borehole, or for any other conveyance of an emulsion explosive. In use, when emulsion explosive is being conveyed through the hose in this way, the aqueous solution of lubricant will ideally be in continuous contact with the inner surface of the hose, and the affinity of the aqueous solution for that surface may result in reduced displacement or destruction of the annular stream. When conveying via a pump, which generates varying or pulsing flow of the emulsion explosive and/or of the annular stream of aqueous solution, there may be periodic disruption or destruction of the annular stream resulting in discontinuities in the integrity of the annular steam around the core of emulsion explosive. Should the annular stream be disrupted, flow may be more easily and effectively re-established when using the hose in accordance with the invention due to the affinity of the aqueous stream for the inner surface of the hose.

When the emulsion explosive and annular stream of lubricant are static in the hose, for example when one borehole has been loaded and a borehole delivery system is being moved for loading of another borehole, the surface properties of the hose may help retain the integrity of the annular stream and prevent deposits of emulsion explosive from forming on the internal surface of the hose. Deposits may otherwise influence flow conditions in the hose and contribute to hose fouling when flow is re-commenced. In circumstances where the integrity of the annular stream is compromised, the inner surface of the hose may assist in re-establishing the annular stream.

The emulsion explosive that is used is typically an emulsion comprising a discontinuous phase made up of droplets of an aqueous salt solution dispersed in a continuous oil/fuel phase. The surface properties of the internal surface of the hose may also serve to repel the emulsion explosive thereby minimising or preventing deposit formation should the emulsion come into contact with the internal surface of the hose.

Various operational improvements may be achieved using a hose in accordance with the invention. For example, the invention may allow reduced hose (pumping) pressure during steady state operating conditions. Reduced loading pressures may place reduced burden on pumps and ancillary equipment. In turn, this may provide capital savings, for example in equipment cost and/or power consumption. The ability to operate at lower pressure is also significant from a safety perspective Improved lubricity may also allow higher delivery rates of emulsion explosive thereby contributing to an increase in borehole loading efficiency.

Further, the invention may increase allowable down-time or time during which the hose may remain idle with emulsion explosive in the hose, between loadings of boreholes, increase the ability to load boreholes at elevated temperatures, and generally reduce hose fouling. The exact mechanism(s) involved are not fully understood but hose fouling may occur due to loss or deterioration of aqueous annular lubricant stream and/or build up of emulsion explosive on the internal surface of the hose. Fouling can lead to loss of core annular flow, decreased pump rate, and loss of lubricity. Increased pumping pressure may be required to maintain a given volumetric flow rate through the hose. Less fouling can result in an accelerated delivery rate as well as energy savings since pump-generated pressure will not need to be used to remove hose fouling. Less fouling can also enable longer hose length and loading of emulsion explosives into deeper bore holes and extended loading operations without suffering from interruption due to hose blocking. Hose fouling has previously been a particular problem when conveying emulsion explosive under conditions of elevated temperature, such as when just-in-time emulsion explosive manufacture occurs.

In the various embodiments of the invention the emulsion explosive and annular stream of lubricant are typically conveyed (caused to flow) through the hose using a pump or respective pumps. However, in principle, gravity or hydrostatic head pressure may be used to achieve flow of one or both of the emulsion explosive and lubricant.

Typically, in practice of the invention the emulsion explosive is being conveyed into a borehole in the context of a commercial blasting operation. However, the invention may be applied in any context where it is desired to move an emulsion explosive from one location to another through a hose and where an aqueous annular stream of lubricant is used. For example, it may be desired to move the emulsion explosive from one storage tank to another storage tank.

As noted above, use of a treated hose can result in increased lubricity. Lubricity of a hose can be measured by several means including, for example, pressure drop across the hose during borehole loading, at start-up of pumping emulsion explosive into a borehole, and during steady state flow conditions, i.e., when steady state flow has been established for a period of time. Start-up pressure may be measured, for example, at about 0-2 seconds from commencement of pumping and steady state at >6-60 seconds following commencement.

Use of a hose of the invention can result in a lower pressure during start-up and/or a lower pressure during steady state operation than a hose without a hydrophilic internal surface. Likewise, the pressure required for conveying emulsion explosive through the hose depends on several factors including, for example, the length of the hose, temperature of the emulsion explosive, and the type of emulsion explosive. For example in embodiments of the invention, using a 10 meter hose, average pressure during start up can be reduced by about 0.5 bar to about 1.5 bar. Furthermore, during steady state pumping, pressure loss along the length of the hose can be reduced by about 0.1 bar to a final operating pressure loss of about 0.5 bar (measured relative to a conventional high density polyethylene hose).

Delay between boreholes during loading provides an opportunity for further hose fouling and resulting increased pressure. Increased pressure and fouling can be measured by determining the pressure at the injector for the aqueous solution that forms the aqueous annular stream. In accordance with the present disclosure, the magnitude of pressure at the injector can be from about 25% to about 50% lower on start up when compared with use of a conventional high density polyethylene hose.

Embodiments of the present invention are illustrated with reference to the following non-limiting examples.

Example 1

In this and other examples the hose used is a polyethylene hose.
Components:
Treated Hose: Hydrophilic treated polyethylene hose (S1-S4): internal surface of the hose was surface treated by a sulfonation process performed by Sulfo Technologies (Michigan, USA) to varying extent. This technology is described in U.S. Pat. No. 6,758,910.
S1 was most highly sulfonated and S4 was least sulfonated.
Untreated Hose: polyethylene hose.
Hose dimension: about 10 cm length, 19 mm internal diameter
ANE3: Ammonium nitrate and calcium nitrate emulsion, density of 1.45 g/cc, emulsion temperature at 20° C.
Method:
Hoses were cross-sectioned to expose the inner hose surface. A cross section of each hose was wetted with running water while a small amount of ANE3 placed on the tip of a pipette was brought into contact with the hose. The degree of fouling was noted visually.

Results:

The degree of fouling was monitored. The treated hose had better anti-fouling properties as compared to an untreated hose.

Example 2

Pressure drop serves as an indicator of the likelihood of hose blockages, as the degree of fouling is reflected by a larger pressure drop when all other conditions remain constant. Therefore, pressure drop across the hose was used to evaluate performance Components:
Treated Hose: Hydrophilic treated polyethylene hose: internal surface of the hose was surface treated by a sulfonation process performed by Sulfo Technologies (Michigan, USA). Treated hose dimensions: 10 meter length, 19 mm internal diameter
Pump: compressed air double-action piston pump
Untreated polyethylene hose
Un-treated hose dimensions: 10 m, 19 mm
Nozzle: Fulljet® ¾ wide angle full cone spray tip. The nozzle is attached to the end of the hose. It serves two purposes: mixing the aqueous lubricant with the ANE and (in use) spraying the mixture into a borehole.
ANE2: Ammonium nitrate emulsion, density of 1.33 g/cc, emulsion temperature at 40° C.
ANE4: A variant of ANE2 with alternative fuel blend, density is 1.33 g/cc, emulsion temperature at 40° C.
Nozzle: Fulljet® ¾ wide angle full cone spray tip
Both emulsions loaded with 3 wt % aqueous annular stream of 10% sodium nitrite Hydrotechnik® 5050 data logger
Method:

Each hose was connected to a ¾ inch nozzle was used to mix the aqueous annular stream with the ANE. Each of the emulsions was delivered by the pump at a target rate of 65 kg/min in the presence of the aqueous annular stream. Emulsion temperature was maintained about 45° C. in order to determine effectiveness at high ANE temperatures. The hose was primed by pumping emulsion explosive and lubricant through the hose and ensuring accuracy of the ANE: aqueous annular stream. The pump was then shut down for 20 minutes in order to simulate delay time between boreholes. Then, the pump was started up until steady state flow was reached and the pressure drop across the hose, as indicated by constant pressure drop across the hose over time, was monitored. A Hydrotechnik® 5050 data logger was used to log the pressure profile during pumping. The pressure difference between the transmitters and the end of the hose was taken as the differential pressure drop across the hose.

Two emulsions were evaluated: ANE2 and ANE4. Three runs were carried out for each ANE/hose combination, except for ANE2 in the treated hose where only two runs were carried out due to a trial constraint.

Results:

FIG. 1 shows a typical pressure drop profile over time. Specifically, FIG. 1 shows pressure drop across a 10 meter treated hose with ANE4 delivery. The shut-down time was 20 minutes and the target delivery rate was 65 kg/min. The pressure drop decreased with time and reached a steady state after about 6 seconds. The pressure profile from the 3 repeated runs showed good reproducibility.

Figure 2:
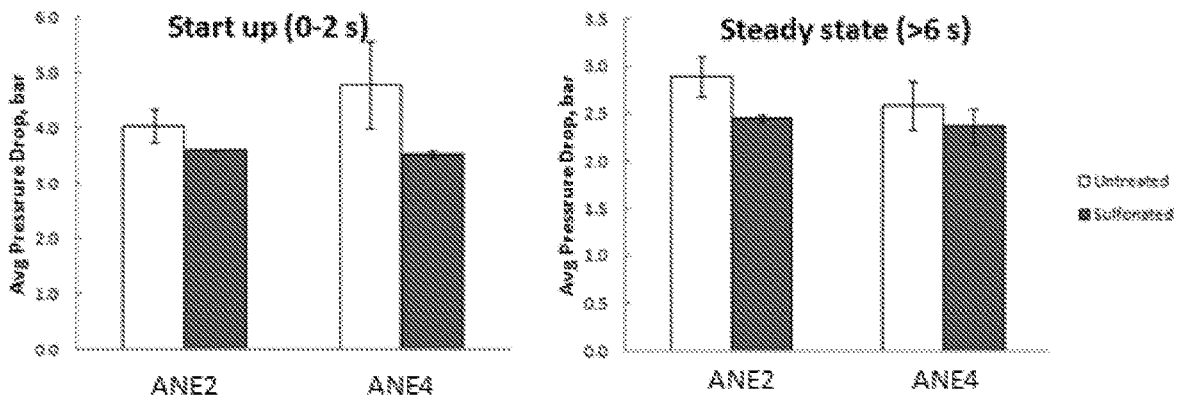
FIG. 2 shows plots illustrating results as referred to in Example 2.

The average pressure drop across both the treated and untreated hoses for the two emulsion explosives are summarized in Table 1 and FIG. 2. Specifically, FIG. 2 shows the average pressure drop across untreated and treated hoses at start up (left) and steady state (right). ANE4 is a variant of ANE2 containing an alternative fuel blend.

The start up process was measured at ~0-2 second and steady state was reached at more than 6 seconds. The treated hose consistently gave a lower pressure drop across the hose compared to the untreated hose.

Use of the treated hose resulted in a pressure decrease during start up by 11 to 26% and steady state pressure decreased 8 to 15% across the hose as compared to the untreated hose.

TABLE 1

Average pressure drop across untreated and treated hose at various time intervals for ANE2 and ANE4

| | | Average pressure drop, bar | | | |
|---|---|---|---|---|---|
| | | 0-2 s (start up) | 2-4 s | 4-6 s | >6 s Steady state |
| ANE2 | Untreated | 4.0 | 3.6 | 3.1 | 2.9 |
| | Treated | 3.6 | 2.9 | 2.7 | 2.5 |
| | Difference, % | 11 | 19 | 12 | 15 |
| ANE4 | Untreated | 4.8 | 3.7 | 3.0 | 2.6 |
| | Treated | 3.5 | 2.9 | 2.6 | 2.4 |
| | Difference, % | 26 | 21 | 14 | 8.3 |

Example 3

Components:
Treated Hose: Hydrophilic treated polyethylene hose internal surface of the hose was surface treated by a sulfonation process performed by Sulfo Technologies (Michigan, USA)
Hose dimensions: 60 meter length, 19 mm in diameter
Un-treated polyethylene hose
Un-treated hose dimensions: 60 m, 19 mm in diameter
Aqueous annular stream: 10% sodium nitrite solution
ANE3 (density—1.45 g/cc) and ANE4 (density—1.33 g/cc) 48-53° C.
Method:

In order to determine the effectiveness of a treated hose in the field a loading trial was performed using a standard length hose. Emulsion explosive temperature was maintained at about 48 to 53° C. and the delivery rate was about 68-75 kg/min. The pressure profile injector for the aqueous annular stream was monitored during the delay periods. As in Example 3, the pump was shut down to simulate delay time between boreholes. A 3 minute delay time between 5 consecutive runs followed by a 20 minute delay time was tested.

Figure 3A:
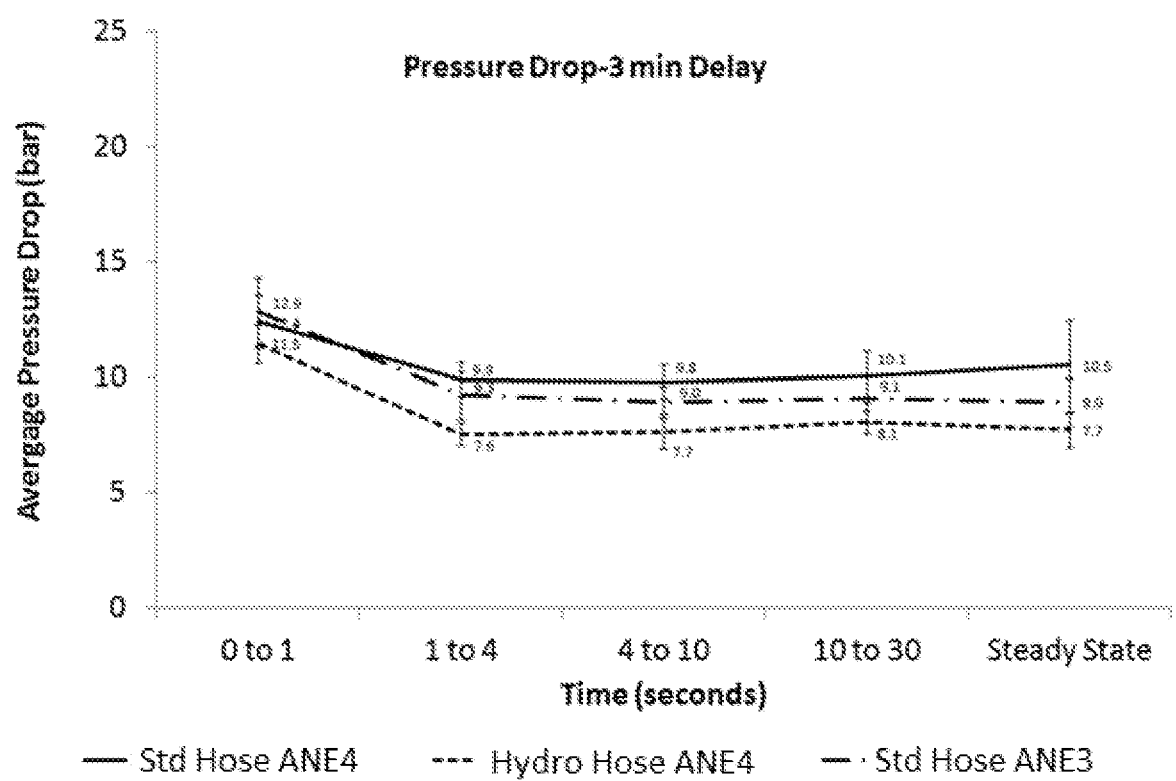
FIG. 3a shows a chart reflecting pressure drop with time as referred to in Example 3.
Figure 3B:
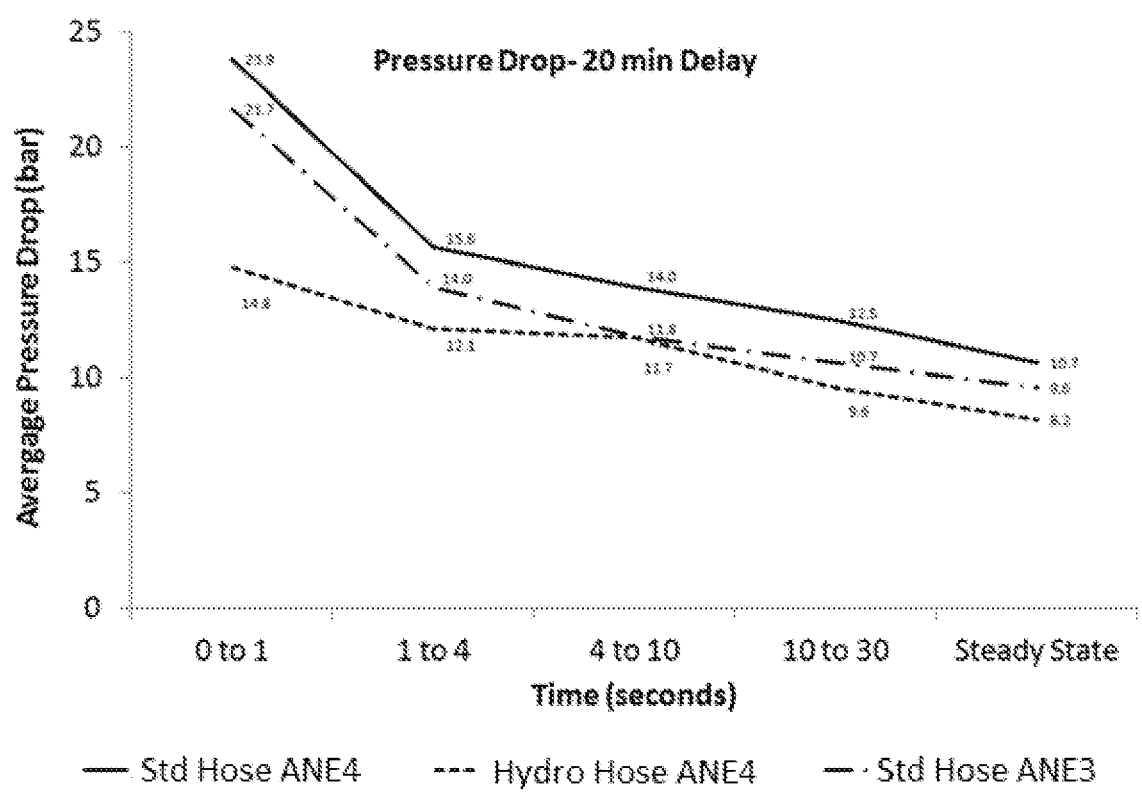
FIG. 3b shows a chart reflecting pressure drop with time as referred to in Example 3.

Results:

FIGS. 3a-b provide a comparison of pressure drop after a three minute delay and a 20 minute delay for a treated hose with ANE4 (dash line), untreated hose with ANE4 (solid line), and a untreated hose with ANE3 (dash dot line), respectively. Following the three minute delay, the treated hose provided a lower average pressure at both start up and steady state flow. When a 20 minute delay time was used, the start up pressure drop (as compared to the 3 minute delay) increased by almost 8% for the treated hose and by about 50% for the untreated hose.

Figure 3C:
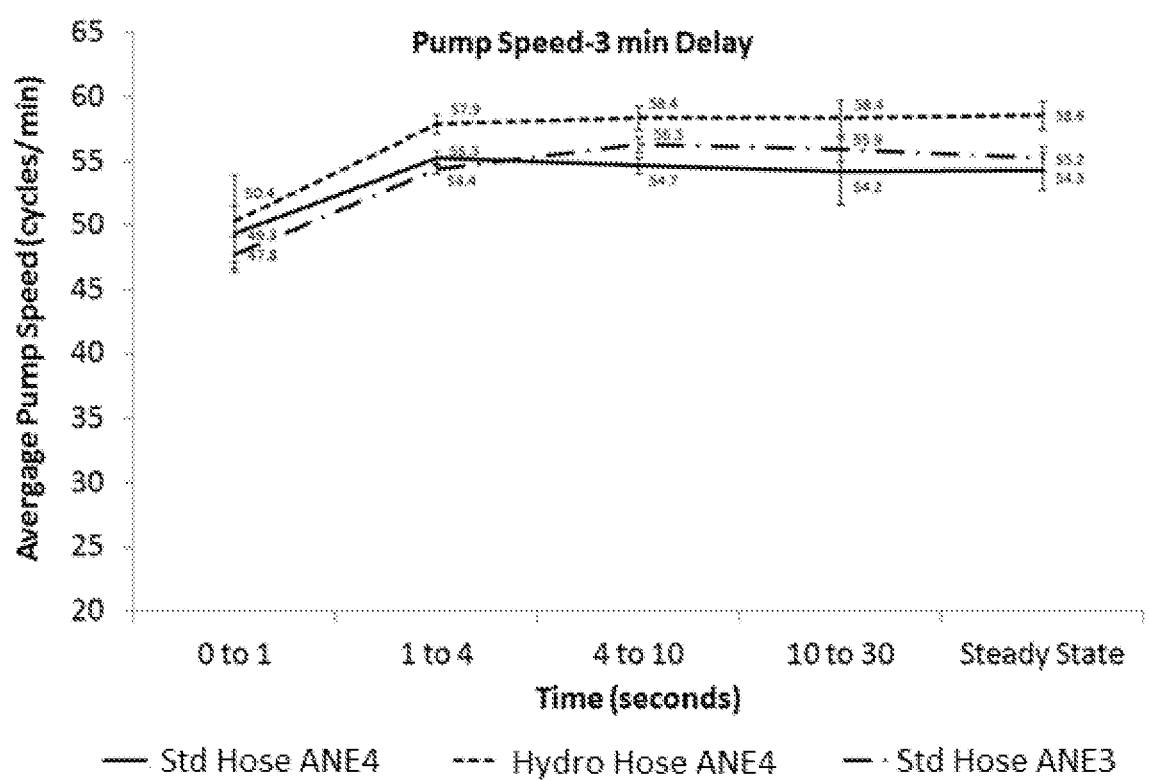
FIG. 3c shows a chart reflecting pump speed with time as referred to in Example 3.
Figure 3D:
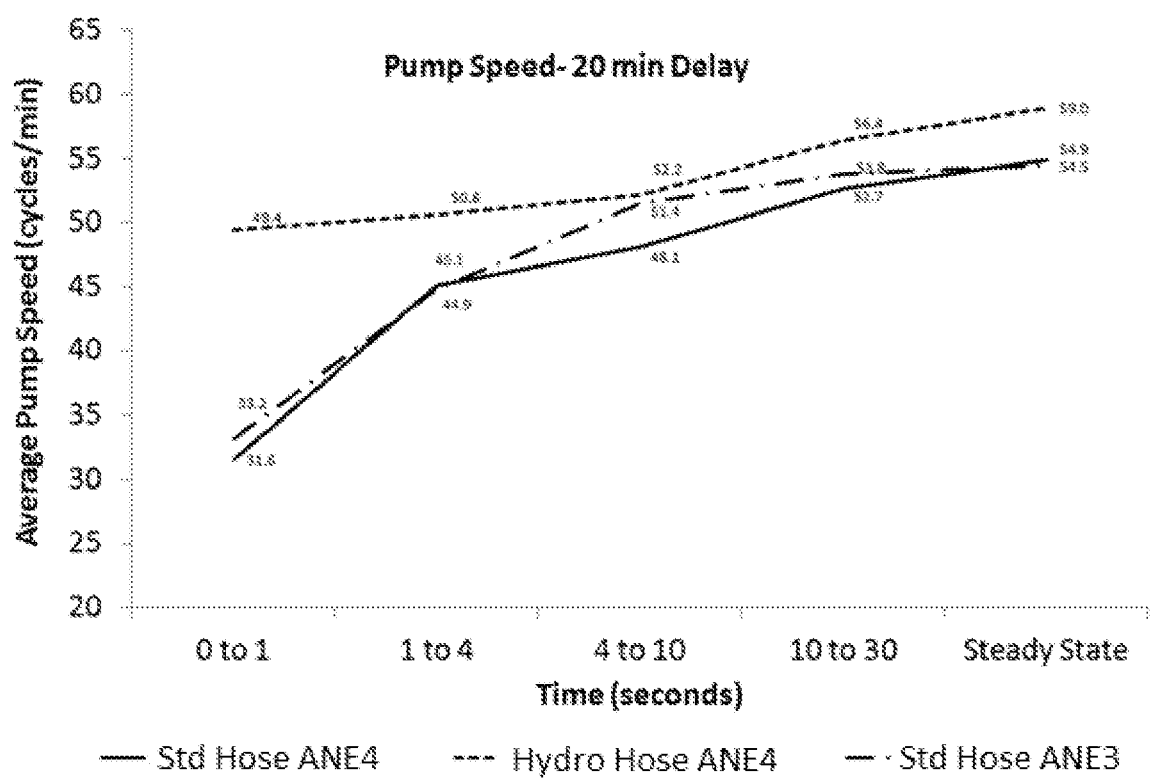
FIG. 3d shows a chart reflecting pump speed with time as referred to in Example 3.

In order to provide an estimate for borehole filling time, pump speed was measured. As depicted in FIGS. 3c-d, the lower pressure drop in the treated hose matched the higher average pump speed. The pump speed of the ANE3 was slightly higher than that of the ANE4 with the untreated hose, consistent with the lower pressure drop in the former.

As shown in FIG. 3d, even with the 20 minute sleep time, the treated hose maintained the starting pump speed at 50 cycles/min ensuring rapid, steady-state delivery as compared to the time required for the untreated hose.

As noted above, pressure readings were taken at the injector of the aqueous annular stream and pressure was monitored during the delay periods, in the absence of ANE loading, to determine the probability of hose fouling during delays between pumping or borehole filling. Since subsequent loading increases pressure at the injector (due to additional hose fouling), low pressure at the injector indicates less hose fouling and less likelihood of hose fouling during the next loading.

Figure 3E:
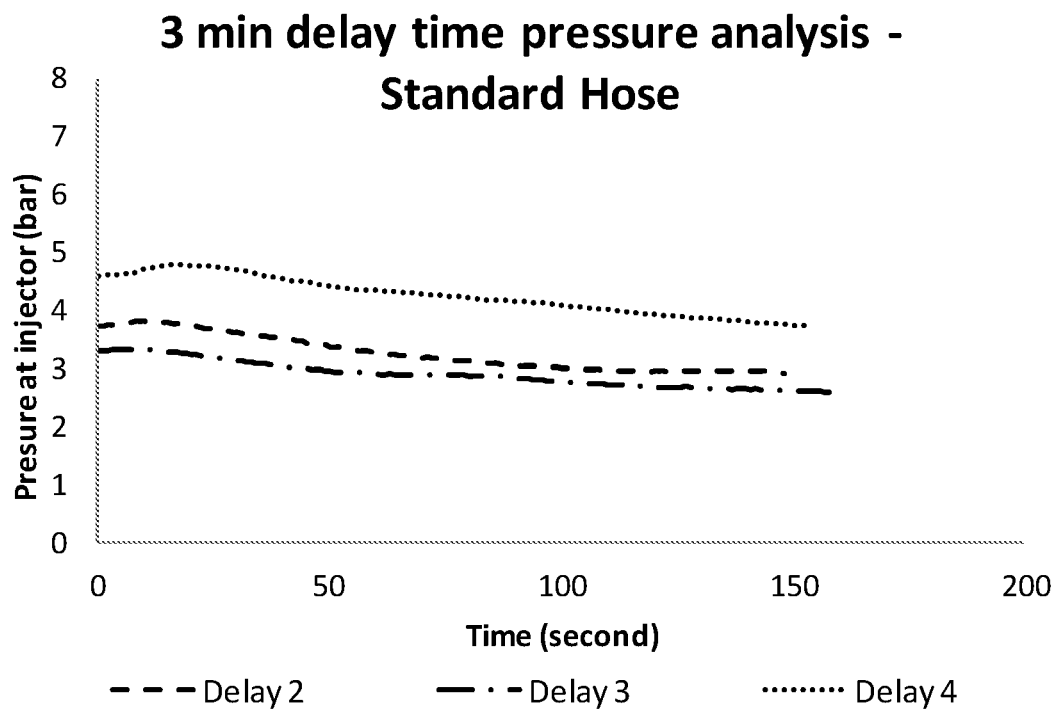
FIG. 3e shows a chart reflecting pressure at injector with time as referred to in Example 3.
Figure 3F:
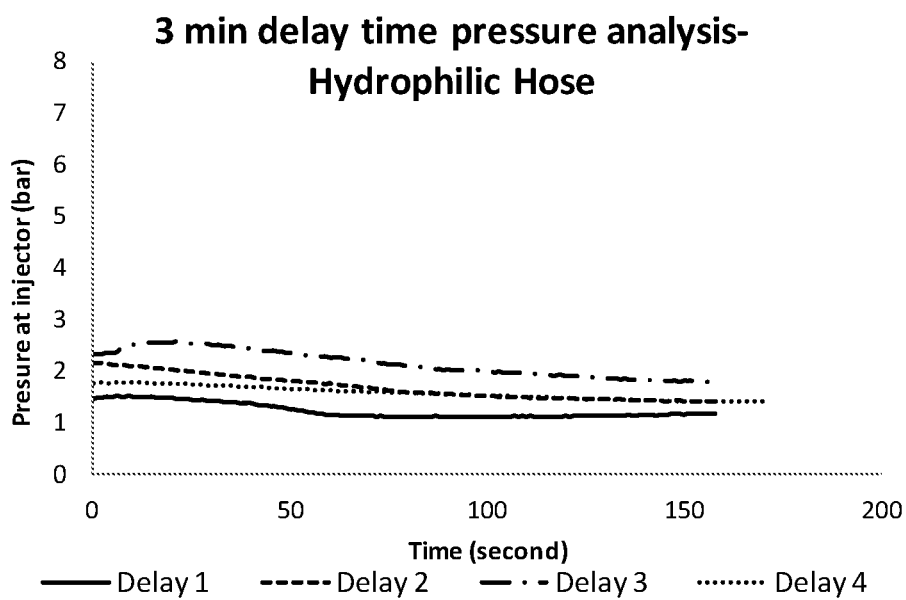
FIG. 3f shows a chart reflecting pressure at injector with time as referred to in Example 3.

As depicted in FIGS. 3e-f, during a three minute sleep time, the pressure at the injector increased initially due to the gassing reaction in hose, followed by a decreasing trend as pressure was relieved by the aqueous annular stream and any emulsion explosive remaining from the prior loading cycle, moving through the hose and being ejected. The pressure at the injector was about 50% lower for the treated hose as compared to the untreated hose. Since pressure increases over time, several runs were performed using ANE4 in both the treated and untreated hoses.

Figure 3G:
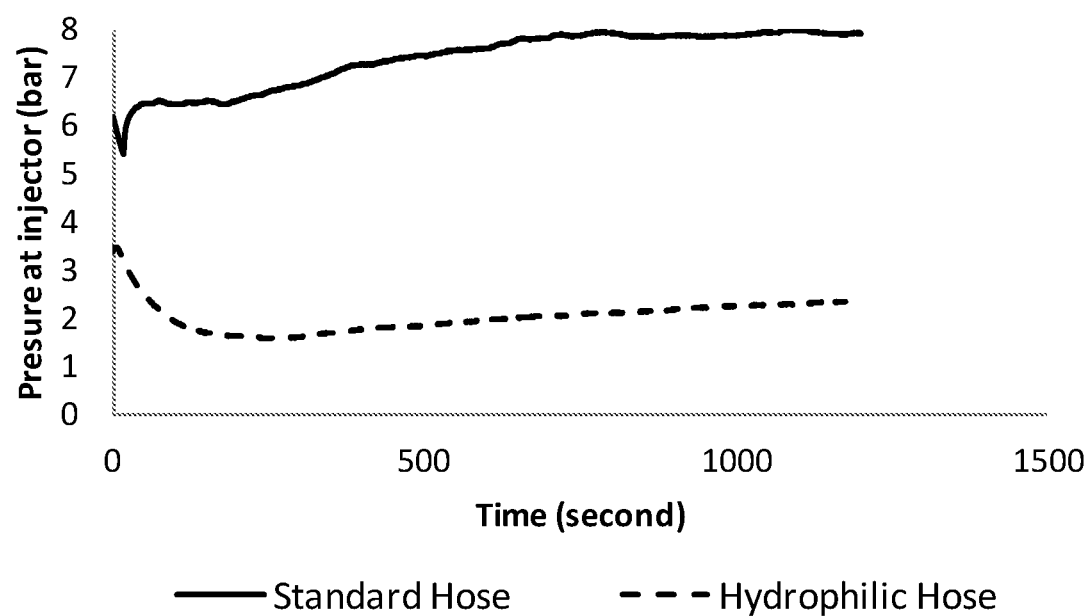
FIG. 3g shows a chart reflecting pressure at injector with time as referred to in Example 3; and, FIG. 3h shows charts reflecting fanning friction factor with time as referred to in Example 4.

FIG. 3g depicts the pressure at the injector for both the untreated hose (solid line) and the treated hose (dash line) after a 20 minute delay time. In the untreated hose, pressure was greater than that of the treated hose and it increased with time as emulsion and/or the aqueous annular stream were unable to be ejected leading to further destruction of the continuity of the aqueous annular stream and subsequent hose fouling by the emulsion explosive. Pressure in the untreated hose reached 7.9 bar after 20 minutes of delay time. In contrast, the pressure in the treated hose showed an initial drop off at emulsion/aqueous annular stream ejection and had a steady increase to 2.3 bar after 20 minutes delay time.

A dimensionless friction factor for the flow in a hose can be defined as a function of hose parameters and fluid properties. This friction factor can be used to quantify the extent of hose fouling and approximate time to hose blockage. For fluids of similar Reynolds Number, an increase in friction factor can indicate increased fouling of the emulsion on the hose wall. One common factor used, the Fanning friction factor (f), can be calculated as follows:

$$f = \Delta p_f D / 2 \Delta L \rho v^2$$

where:
$\Delta p_f$=change in pressure due to friction
D=tube inner diameter in meters
$\Delta L$=tube length in meters
V=average fluid velocity (m/s)
$\rho$=fluid density (kg/m$^3$)

Figure 3H:
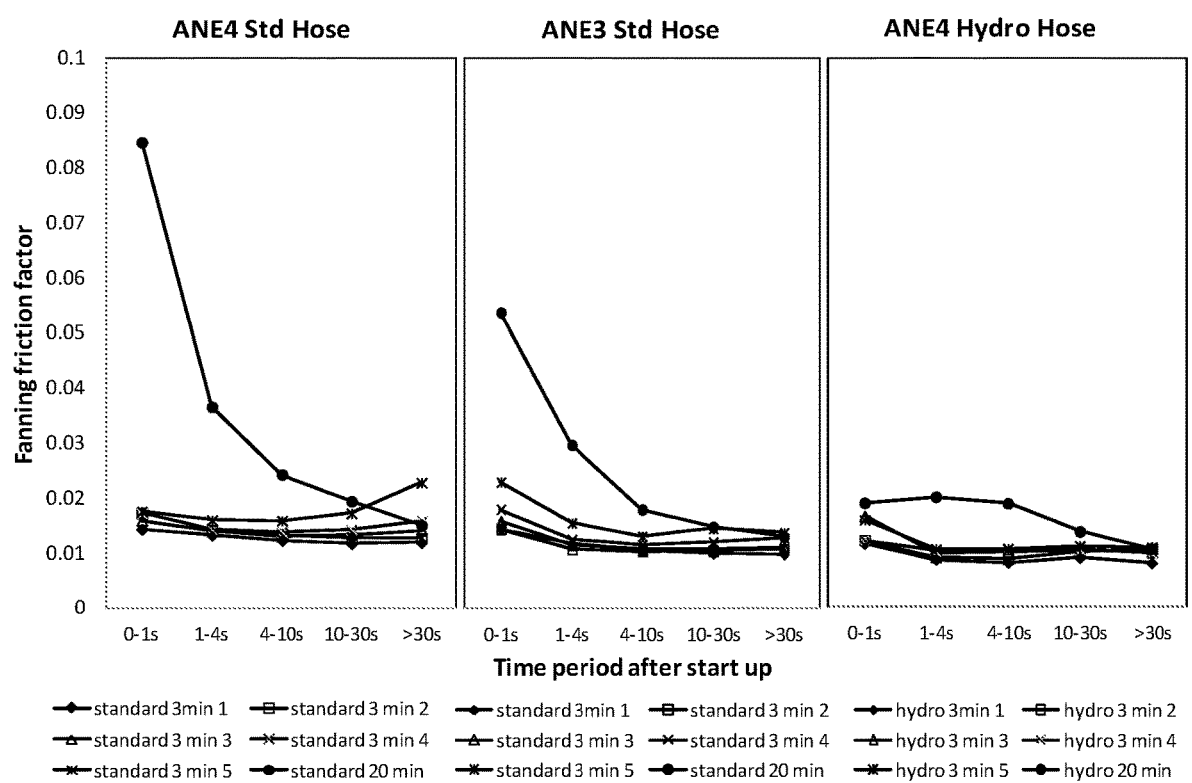

As reflected in FIG. 3h, use of a treated hose resulted in both reduced friction factor on start up and during steady state flow. A decrease in Fanning friction factor may be representative of reduced hose fouling.

Start up was measured at ~0-1 seconds after pump operation began. Following a 3 minute delay time, a reduction of up to 30% in Fanning friction factor was achieved at start up when ANE4 was delivered in the treated hose as compared to in untreated hose. With a 20 minute delay time, a reduction of 78% in Fanning friction factor was achieved on start up when ANE4 was delivered in a treated hose as compared to an untreated hose. The steady state was measured at 30 seconds or more after pump operation began. A reduction of up to 53% in Fanning friction factor was achieved at steady state when ANE4 was delivered in a treated hose as compared to an untreated hose. The significant reduction in Fanning friction factor during start up and steady state when ANE4 was delivered in a treated hose as compared to an untreated hose suggested the use of a treated hose rendered reduction in hose fouling, reduced likelihood of hose blockage incidents, and decreased down time.

Example 4

Components:
Treated Hose: Hydrophilic treated polyethylene hose: internal surface of the hose was surface treated by a sulfonation process performed by Sulfo Technologies (Michigan, USA)
Hose dimensions: 60 meter length, 19 mm in diameter
Untreated polyethylene hose
Untreated hose dimensions: 60 m, 19 mm in diameter
Aqueous annular stream: 10% sodium nitrite, plus 5% catalyst solution
ANE: ANE4 (density—1.33 g/cc) 55-60° C.
Pump: compressed air double-action piston pump
Pre-thickener configuration: 8 mm and 10 mm or 8 mm and 12 mm orifice size
Nozzle type: Fulljet® ¾" wide angle full cone spray tip
Method:

The stability of core annular flow in hose is influenced by ANE viscosity. Lower viscosity ANE is more likely to foul the hose and cause hose blockages than higher viscosity ANE. The viscosity of ANE can be altered by changing the pump orifice size creating what is known as a "pre-thickener configuration". In this example, the two pre-thickener configurations tested are 8 and 10 mm orifices or 8 and 12 mm orifices. Prior to pumping the viscosity of the ANE4 was 570 Pas. The viscosity of ANE4 after passing through the configuration was 1398 and 1091 Pas, respectively. ANE viscosity was determined at a constant shear rate of 0.2 s$^{-1}$ with a rheometer.

Each hose was connected to a Fulljet® ¾" nozzle which was used to mix the aqueous annular stream with the ANE. The emulsion was delivered with a pump at a target rate of 65-70 kg/min in the presence of the aqueous annular stream. Target emulsion temperature was 35-40° C. The test consisted of hose priming and delivery of emulsion explosive through the hose three times. The hose was primed by pumping ANE and an aqueous annular stream through the hose. Then 70 kg of ANE was delivered and pump was shut down for 10 minutes to simulate delay time between boreholes. This was followed by two repetitions of 70 kg ANE delivery and 10 minutes pump shut down when no hose blocking occurred. Pressure drop across the hose was monitored and hose blocking events were noted. If hose blocking occurred, the test was repeated.

ANE was delivered using untreated and treated hoses with each pre-thickener configuration.
Results:

Table 2 provides a summary of the test results from the pumping trial.
Untreated Hose:

No hose blocking occurred when ANE4 was pumped with 8 and 10 mm pre-thickener configuration. However, the hose blocked when ANE4 was pumped with 8 and 12 mm pre-thickener configuration. Duplicate testing was carried out. During first test, the untreated hose blocked after 30 seconds of pumping. In the second test, the hose blocked after 2 seconds of pumping. The hose blocking occurred with the lower viscosity ANE4 formed by the 8, 12 mm pre-thickener configuration of the pump. This caused a higher level of fouling and core annular flow instability in hose.

Treated Hose:

No hose blocking occurred during ANE4 was pumping with either the 8 and 10 mm or 8 and 12 mm pre-thickener configuration.

In the treated hose, a reduction in Fanning friction factor of 13.3% was observed when ANE was pumped with the 8 and 10 mm pre-thickener configuration. The treated hose was fouled to a greater degree when ANE was pumped with 8 and 12 mm pre-thickener configuration but maintained pumpability at an acceptable pressure.

A reduction of 25.7% in Fanning friction factor under steady state operation was observed when ANE4 was delivered in treated hose compared to an untreated hose. Use of a treated hose for delivery of ANE4 using an 8 and, 10 mm pump configuration rendered a reduction in hose fouling and a reduced likelihood of hose blockage.

is typically loaded with 50 meter untreated hose. However, a 60 meter treated hose was used in the trial providing greater opportunity for hose fouling due to the extended length. Feedback from hose operators were used to assess the performance of the treated hose. The pump pressure readout of the MCU was inaccurate depicting significantly fluctuating pressure limiting the recordable data for this trial. Only an approximate value of the pump rate and pressure at the injector of the aqueous annular stream was recorded. Seventeen surveys of the untreated hose and 11 surveys of the treated hose from three different operators were collected in this trial.

Results:

Prior to installing the treated hose on the MCU, the pump would begin fouling after 800-1000 kg of ANE pumped and injection of a slug of water was required to get the pump back to full speed. Use of the treated hose, resulted in no blockages or signs of fouling.

TABLE 2

| Hose type | Pre-thickener | Run # | Temp (° C.) | Pump rate (kg/min) | ANE pumped (kg) | Pressure drop across hose (bar) | Fanning friction factor | Comments |
|---|---|---|---|---|---|---|---|---|
| Untreated | 8 mm, 10 mm | 1 | 40~55 | 66~68 | 30 | 10.4 | NA | Priming fresh hose |
|  |  | 2 | 40~55 | 66~70 | 70 | 10.2 | 0.0134 | after 10 min delay |
|  |  | 3 | 40~55 | 66~70 | 70 | 10.2 | 0.0134 | after 10 min delay |
|  |  | 4 | 40~55 | 63~70 | 70 | 10.7 | 0.0150 | after 10 min delay |
| Untreated | 8 mm, 12 mm | 1 | 35~45 | 70~77 | 30 | — | NA | Priming used hose |
|  |  | 2 | 35~45 | 70~77 | 59.6 | 11.2 | 0.0126 | after 10 min delay |
|  |  | 3 | 35~45 | 66~68 | >30 | 11.1 | NA | adjusted rate down |
|  |  | 4 | 35~45 | 66~71 | Blocked after 30 s | — | Blocked hose | after 10 min delay |
| Untreated | 8 mm, 12 mm | 1 | 55~60 | 72~75 | 30 | — | NA | Priming used hose |
|  |  | 2 | 55~60 | 74~82 | 70 | 10.8 | 0.0108 | after 10 min delay |
|  |  | 3 | 55~60 | 65~70 | >30 | — | NA | adjusted rate down |
|  |  | 4 | 55~60 | 65~71 | Blocked in 2 s | — | Blocked hose | after 10 min delay |
| Treated | 8 mm, 10 mm | 1 | 40~55 | 62~67 | 30 | 7 | NA | Priming fresh hose |
|  |  | 2 | 40~55 | 60~65 | 70 | 6.9 | 0.0108 | after 10 min delay |
|  |  | 3 | 40~55 | 60~65 | 70 | 6.6 | 0.0103 | after 10 min delay |
|  |  | 4 | 40~55 | 60~66 | 70 | 6.6 | 0.0101 | after 10 min delay |
| Treated | 8 mm, 12 mm | 1 | 35~45 | 66~68 | 30 | 8.1 | NA | Priming fresh hose |
|  |  | 2 | 35~45 | 63~66 | 70 | 8.4 | 0.0123 | after 10 min delay |
|  |  | 3 | 35~45 | 62~66 | 70 | 7.9 | 0.0118 | after 10 min delay |
|  |  | 4 | 35~45 | 62~66 | 70 | 7.9 | 0.0118 | after 10 mins delay |

Example 5

Components:

Treated Hose: Hydrophilic treated polyethylene hose: internal surface of the hose was surface treated by a sulfonation process performed by Sulfo Technologies (Michigan, USA). Hose dimensions: 60 meter length, 19 mm in diameter Untreated polyethylene hose Untreated hose dimensions: 50 m, 19 mm in diameter Aqueous annular stream: 10% nitrite solution ANE: ANE1 (density—1.33 g/cc) 36-44° C.

Nozzle type: Fulljet® ½" wide angle full cone spray tip

Underground delivery unit mobile charging unit (MCU)

Method:

A full scale field trial was carried out to obtain qualitative feedback on performance of treated hose under normal operating conditions, assess treated hose life, and determine the quality of the treated hose at its end of life. ANE1 was delivered using a mobile underground ANE delivery unit (MCU). ANE1 temperature was 36-44° C. At this site, ANE1

TABLE 3

|  | Untreated hose | Treated hose |
|---|---|---|
| Numbers of feedback | 17 | 11 |
| Average delivery rate, kg/min | 70 | 80 |
| Average pump pressure, bar | 3965 | 3820 |
| Hose blocking incidence | Once every 800-1000 kg | None |
| Estimated reduction in friction factor | — | 44-77% |

Feedback from operators was very positive. Some observations reflected the following relevant points.

Using the untreated hose the pumping rate was around 70 kg/min and the delivery system was laboring.

Using the treated hose there was a noticeable difference in pump rate (80 kg/min) even though the average pumping pressure was slightly lower. The operation was smooth and there was no evidence of hose fouling even though the ANE was being used at a high temperature (>41° C.).

This anecdotal feedback showed that the treated hose resulted in increased pump speed from 70 to 80 kg/min, while the average pump pressure dropped by 0.15 bar in spite of the treated hose being 10 meters longer than the untreated hose (60 m rather than 50 m). A reduction of friction factor by 44-77% in using the treated hose can be inferred.

The treated hose was used continuously until deemed to be at the end of its life as indicated by exterior damage such as kinking and splitting, which is common to hose use in these conditions application. The treated hose lasted one swing (mine shift roster length) longer than typically achieved by an untreated hose and the hose life was not compromised by the internal surface treatment of the hose. Furthermore, the interior of the hose surface felt smoother compared to the original hose lining at the end of life, suggesting that the treated hose treatment was still in good condition at end of hose life. The inner surface of the treated hose appeared to have retained its hydrophilicity throughout the hose life.

Example 6

Components:
Treated hose: Hydrophilic treated polyethylene hose: internal surface of the hose was surface treated by a sulfonation process performed by Sulfo Technologies (Michigan, USA).
Hose dimensions: 51 meter length, 19 mm in diameter
Untreated polyethylene hose
Untreated hose dimensions: nominally 50 m, 19 mm in diameter
Aqueous annular stream: 6% sodium nitrite solution
ANE: ANE4 (density—1.33 g/cc) 40-42° C.
Nozzle type: Fulljet® ¾" wide angle full cone spray tip
Underground delivery unit (MCU)
Method:
On this site, use of ANE at temperatures of around 40° C. and above resulted in blocking of an untreated hose. A side by side test of treated and untreated hoses was conducted at varied ANE temperature.

It should be noted that typical flow rate for borehole loading is approximately 75 kg/minute. If the hose is beginning to block, the flow rate can slow to about 10 kg/minute or until the pump reaches its safety limit of 40 bar, after which it will automatically shut down.

Results:
Untreated Hose: Monitoring was conducted at moderate ANE temperatures, 30-35° C., while loading; no hose blocking issues occurred. Subsequently, loading was monitored using ANE at 40-42° C. in challenging ground conditions that caused lengthy pauses in pumping, up to 19 minutes (as opposed to the typical three minute delay between boreholes). Pumping pressures were typically 35-36 bar with a delivery rate of 75 kilograms per minute. After pumping around 300 kilograms, pumping pressure had increased to the maximum allowable level of 40 bar and flow rate had decreased to 6 kilograms per minute even with the end-of-hose mixing nozzle removed (a typical short term solution); the untreated hose was blocked. It was flushed with water and re-primed with ANE but blocked again after pumping less than 100 kg. Treated Hose: Under the same conditions as above, with the ANE at 40-42° C., and the same challenging ground conditions resulted in a number of pauses in pumping, up to 19 minutes, but the treated hose never blocked. After the 19 minute pause, the pump was initially slow to start but quickly reached full delivery speed of 75 kg per minute. A total of 800 kg was pumped without issue; pump pressure remained at 35 bar at a delivery rate of 75 kilograms per minute.

Comparative Example

Components:
Hydrophilic treated polyethylene hose internal surface of the hose was surface treated by a sulfonation process performed by Sulfo Technologies (Michigan, USA) 40-50 µg coating; good abrasion resistance.
Hose dimensions: 100 mm in length, 19 mm inner diameter

TABLE 4

| | S1 | S2 | S3 | S4 |
|---|---|---|---|---|
| Level of Sulphonation | High—most hydrophilic | Medium-High | Medium-Low | Low |

Un-treated polyethylene hose
Un-treated hose dimensions: 100 mm
Hydrophobic treated hose: internal surface coated with five types of hydrophobic/oleophobic
Aculon® coatings; 0.02 µm coating thickness; good abrasion resistance
Emulsion: ANE3, density 1.45 g/cc, 20° C.

TABLE 5

| | Aculon E | Aculon E 2x | Aculon H1-F | Aculon ON3112 | Aculon ON396 |
|---|---|---|---|---|---|
| Hydrophobicity (water contact angle on PET) | >105 | >105 | >100 | >100 | >100 |
| Oleophobicity (oil contact angle on PET) | 50-60 | 50-60 | 30 | 30 | 30 |
| Sliding angle of water droplet | 6 | 6 | 6 | 6 | 6 |

Method:
Hydrophobic Dip Test
Untreated and treated hoses were dipped in ANE3 for 30 minutes.
Hoses were removed and the extent of fouling was noted.
Hydrophilic Dip Test
Untreated and treated hoses were dipped in UGS710 for 3 min and then in ANE3 for 10-30 min. UGS710 is an aqueous lubricant formulation comprising magnesium nitrate and sodium nitrite.
Hoses were removed and the extent of fouling was noted.
Hydrophilic Running Water Test
Untreated and treated hoses were continually replenished with running water.
ANE3 placed in contact with hose, observe extent of fouling.
Results:
The untreated hoses showed significant fouling. The hydrophobic treated hoses showed no improvement in fouling. The extent of fouling observed with the hydrophobic treated hoses was essentially the same as for the untreated hose. The hydrophilic treated hoses showed significant improvement during the dip test. S1 showed no fouling. S2-S4 showed some fouling.

The results show that the most highly sulfonated surface (most hydrophilic) exhibits the best antifouling property.

The less hydrophilic surfaces and standard (untreated) hose are less effective with respect to anti-fouling. The use of a hydrophobic hose surface did not prevent fouling.

The invention claimed is:

1. A hose which reduces fouling of an emulsion explosive being conveyed therethrough, characterized in that the hose comprises the emulsion explosive at a temperature of greater than 41° C., together with an annular stream of an aqueous solution around the emulsion explosive as a lubricant, wherein the hose comprises an internal hydrophilic surface with respect to the aqueous solution that reduces disruption of the annular stream during conveying of the emulsion explosive through the hose.

2. The hose of claim 1, wherein the internal surface is hygroscopic with respect to the aqueous solution.

3. The hose of claim 1, wherein the aqueous solution, when placed on the internal hydrophilic surface of the hose, exhibits a contact angle of less than 30°.

4. The hose of claim 1, wherein the hose is formed of polyethylene and has a sulfonated internal surface.

5. The hose of claim 1, wherein the internal hydrophilic surface is one of sulfonated, grafted with hydrophilic polymer, has applied thereto nanoscale structures, or is plasma treated.

6. A method of conveying, in a hose with reduced fouling, an emulsion explosive at a temperature greater than 41° C., characterized in that the method comprises conveying the emulsion explosive through the hose together with an annular stream of an aqueous solution provided around the emulsion explosive, wherein the hose comprises an internal hydrophilic surface with respect to the aqueous solution that reduces disruption of the annular stream during conveying of the emulsion explosive through the hose.

7. The method of claim 6, wherein the emulsion explosive is conveyed through the hose into a borehole.

8. A method of reducing fouling in a hose when an emulsion explosive is conveyed through the hose at a temperature greater than 41° C., characterized in that the method comprises conveying the emulsion explosive through the hose together with an annular stream of an aqueous solution provided around the emulsion explosive, wherein the hose comprises an internal hydrophilic surface with respect to the aqueous solution that reduces disruption of the annular stream during conveying of the emulsion explosive through the hose.

9. The method of claim 8, wherein the emulsion explosive is conveyed through the hose into a borehole.

* * * * *